United States Patent [19]

Danton

[11] Patent Number: 4,732,359
[45] Date of Patent: Mar. 22, 1988

[54] SEAT SUPPORT FOR A PUBLIC TRANSPORT VEHICLE AND SEAT EQUIPPED WITH THIS SUPPORT

[75] Inventor: Jean L. Danton, Boulogne, France

[73] Assignee: Societe Anonyme dite Etablissements Compin, Paris, France

[21] Appl. No.: 913,114

[22] Filed: Sep. 29, 1986

[30] Foreign Application Priority Data

Oct. 1, 1985 [FR] France ................................ 85 14526

[51] Int. Cl.$^4$ ............................................. F16M 13/00
[52] U.S. Cl. .................. 248/629; 248/188.1; 296/63; 296/208; 297/445; 297/DIG. 2
[58] Field of Search ...................... 248/188.1, 628, 618, 248/629, 630; 108/136; 297/445, DIG. 2; 296/63, 65 R, 208

[56] References Cited

U.S. PATENT DOCUMENTS

| 79,534 | 6/1868 | Mellen | 248/628 X |
|---|---|---|---|
| 2,083,716 | 6/1937 | Klar | 248/188.1 X |
| 2,845,111 | 7/1958 | Barecki et al. | 297/DIG. 2 X |
| 3,466,088 | 9/1969 | Flint | 248/630 X |
| 3,747,979 | 7/1973 | Barecki | 297/445 X |
| 3,899,211 | 8/1975 | Barecki | 297/445 X |
| 4,060,279 | 11/1977 | Vogel | 297/445 |
| 4,549,765 | 10/1985 | Hoch | 297/445 X |
| 4,577,907 | 3/1986 | Talmon et al. | 297/445 X |

Primary Examiner—J. Franklin Foss
Assistant Examiner—David L. Talbott
Attorney, Agent, or Firm—Scully, Scott, Murphy & Presser

[57] ABSTRACT

New seat support for a public transport vehicle and seat equipped with this support. The invention relates to a seat support for a public transport vehicle, intended to be mounted overhung on a side wall of this vehicle. As seen in section through a vertical plane perpendicular to the sidewall, the framework of this support has a generally C-shaped cross-section. The upper branck of the C is intended to serve as a base for a seat, the lower branch of the C rests on the floor of the vehicle and is fixed to the latter, and the verticle part of the C, which joins the branches together, is designed to bear against the side wall of the vehicle and to be fixed to the latter.

14 Claims, 7 Drawing Figures

SEAT SUPPORT FOR A PUBLIC TRANSPORT VEHICLE AND SEAT EQUIPPED WITH THIS SUPPORT

The present invention relates to a new seat support for a public transport vehicle. It also relates to seats equipped with this support.

In some cases, public transport vehicles use seats without any leg support and supported by a framework mounted above the seats, on the adjacent partition or wall. Because of this overhead support, these seats are usually referred to, in the art, as "cantilever seats".

The main advantage of seats of this type is that the absence of legs means that it is easier to maintain the vehicles, but the framework of the overhanging supports is usually complex. Also, since these overhanging supports subject the wall on which they are mounted to high stress, which is intensified by the lever arm effect of the seats, it is generally necessary to reinforce the wall of the vehicle to make it capable of withstanding the force transmitted by the seat support, or to provide a vertical bearing rod which compensates the overhang. It should be noted that this reinforcement of the vehicle wall is expensive, and that, to achieve a support equivalent to that of a leg support, the cross-sections, and therefore the weight of the overhanging support have to be increased in very large proportions.

The object of the present invention is to avoid these disadvantages of "cantilever" seats by providing a seat of this type, wherein the support that is mounted overhung on a side wall of the vehicle, subjects this wall to moderate stress only and therefore does not require vertical bearing means to compensate the force of the overhang.

To achieve this, the present invention is a seat support for a public transport vehicle, intended to be mounted overhung on a wall of this vehicle and being defined in that, as seen in section through a vertical plane perpendicular to the wall, the framework of this support has a generally C-shaped cross-section. The upper branch of the C is intended to serve as a base for the seat, while the lower branch of the C will rest on the floor of the vehicle and will be fixed to the latter, and the vertical part of the C joining the branches is designed to bear against a side wall of the vehicle and to be fixed to the latter.

The vertical branch and the horizontal lower branch can be constructed in such a way that:

(1) they form the wall or the floor of the vehicle, (2) bearing in mind the overall size of the seats arranged in a row in a vehicle, the force required to hold the upper horizontal support is distributed over the largest possible area, (3) their dimensions correspond to a construction module of the vehicle, (4) they make it possible to incorporate or replace the ducts serving for heat or for the passage of the various supply lines mounted on the vehicle.

The lower and upper branches of the C can have dimensions which are or are not identical. The upper branch can serve as a base for one, two or even three adjacent seats; and, where several seats rest on the same support, the upper branch of the C can, of course, be substantially longer than the lower branch.

The result, expressed in kilograms, of a force exerted on the horizontal upper branch, on the other branches of the C will therefore be inversely proportional to the area of the latter. By increasing this area, it will be possible to avoid reinforcing the wall of the vehicle. However, it may be necessary, particularly when several adjacent seats rest on the same support, to equip the latter with a strut located between the upper branch of the C and the bottom of the vertical part. The upper part of this strut can be arranged underneath the end of the upper branch of the C or at any other location on the latter, particularly in its central part. The upper edge of the strut can advantageously be fitted into a groove made in the lower face of the upper branch of the C, parallel to the partition. The strut can have any form desired, but preferably, both for esthetic reasons and for reasons of bulk, it can be in the form of a curved triangle, with the lower tip of this triangle bearing against the portion connecting the lower branch of the support to the vertical part, in the central areas of these portions. This strut, because of its position, will therefore not impede the cleaning or maintaining of the public transport vehicle.

The seats for a public transport vehicle, possessing a support of the type just described, are, of course, another subject of the present invention.

The accompanying diagrammatic drawings illustrate various embodiments of the invention. In these drawings.

Figure 1:
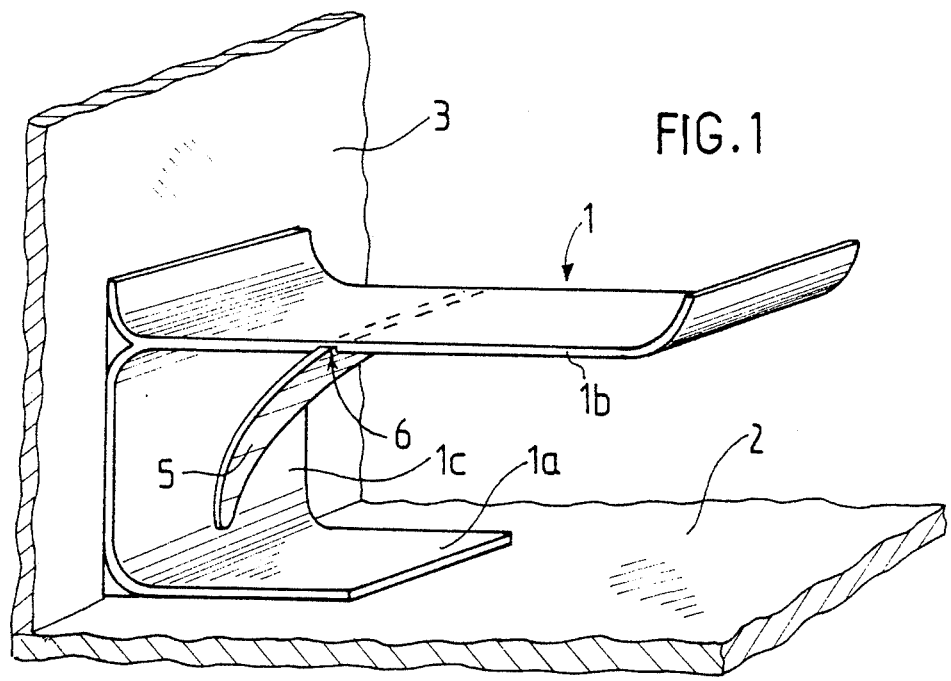
FIG. 1 is a perspective view of the support according to the invention.
Figure 2:
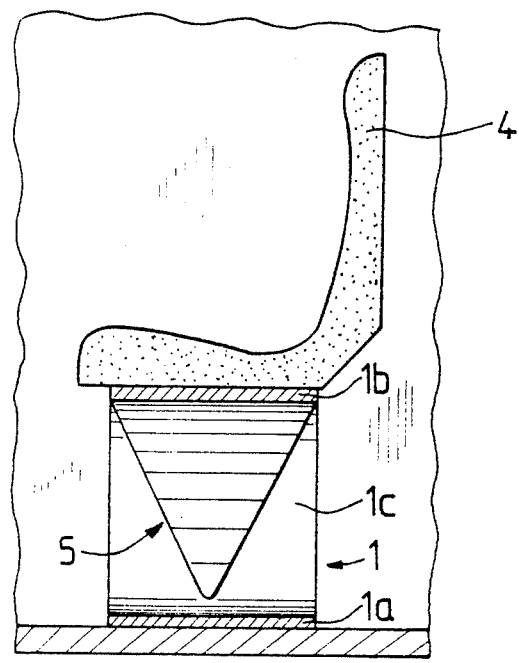
FIG. 2 is a vertical section through this support parallel to the wall which it adjoins, with a seat bearing on its upper part.

The seat support 1 illustrated in FIG. 1 has a one-piece structure, but it could, of course, be composed of several pieces connected rigidly to one another. As seen in a vertical section through a plane perpendicular to the floor 2 of the public transport vehicle and to the side walls 3 of the latter, this support has a C-shaped profile, with the lower branch 1a resting on and fixed to the floor. The upper branch 1b, which itself has an upwardly open U-shaped cross-section, serves as a base for the seat 4; and the part 1c, which joins the part 1a and 1b together, is in contact with and is fastened to the wall 3. The parts 1a and 1c can be fixed to the floor 2 and to the wall 3 respectively by any means known in the art. The part 1a can be fastened directly to the metal floor of the vehicle and locally replace the covering of wood or of another material which covers this floor, so as to fit perfectly into the upper face of this floor which the passenger sees.

In FIG. 1, the support 1 is intended to receive a double seat, and the upper part 1b which serves as a base for the seat, is longer than the lower part 1a which bears on the floor.

Since the framework of the support bears on the floor over a wide area, the support subjects the side wall 3 to much less stress than in the prior art, and there is therefore no need to provide a verticle reinforcing rod underneath the overhanging upper part 1b. If necessary, particularly if the upper part 1b is especially long (for example, where the upper part supports a double seat), it is possible to provide, under this part, a strut 5 which is directed obliquely toward the bottom of the vertical part 1c of the support and which bears against the part 1b connecting together the parts 1a and 1c. This strut 5 can have any suitable form, but advantageously it can be in the form of an inclined curved triangle, as shown in the drawings. One tip of the triangle bears on the lower angle of the support, and the upper part of the triangle is fitted into a groove 6 made in the lower face of the part 1b. The upper part of the strut 5 can be arranged underneath the free end of the part 1b or in any intermediate position.

Figure 3:
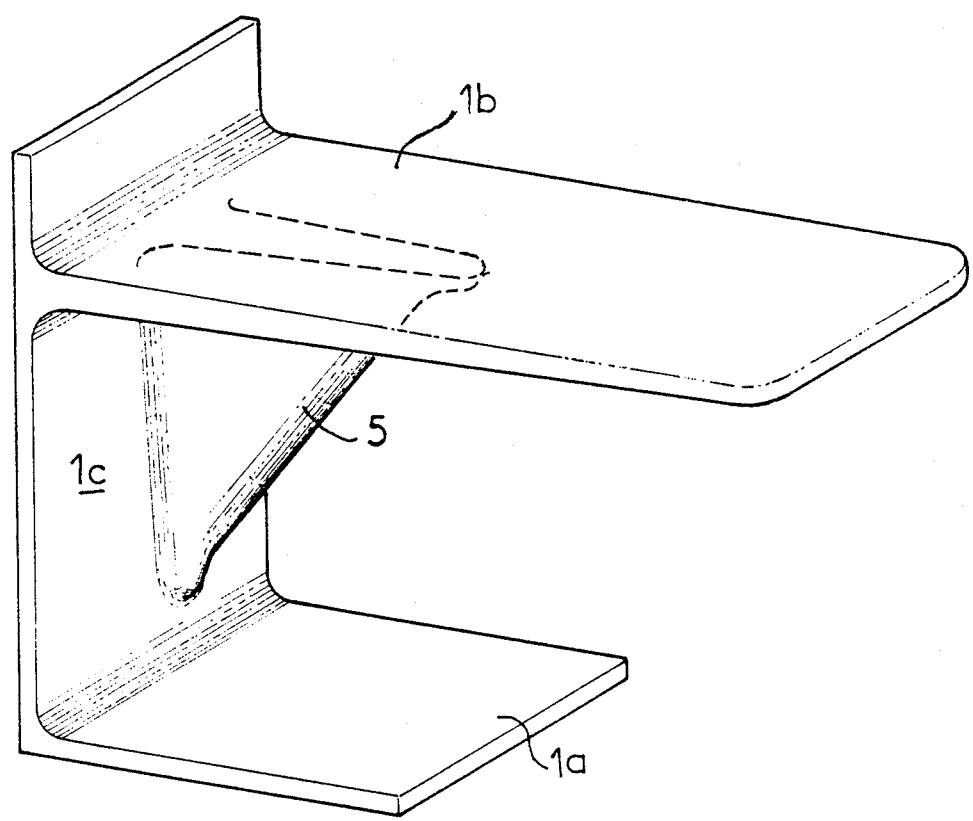
FIG. 3 is a perspective view of another embodiment of the seat support, showing an alternative form of the strut.

As shown in FIG. 3, the strut 5 can also be in the form of a right-angled triangle and can be arranged in the mid-plane passing through the central axes of the branches 1a, 1b and 1c. The two sides of the right angle of the strut are fastened respectively to the vertical part 1c and to the underside of the upper branch 1b.

Figure 4:
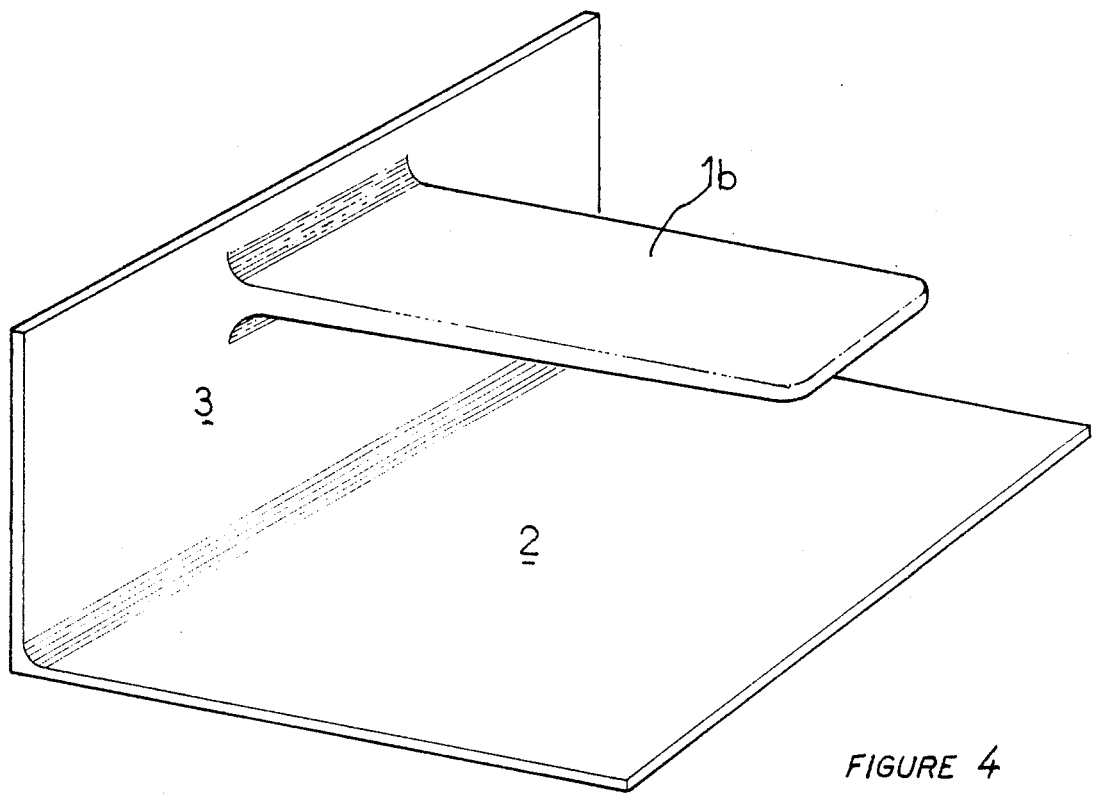
FIGS. 4 to 6 show further forms of supports which are incorporated in the side wall and the floor of the vehicle.
Figure 5:
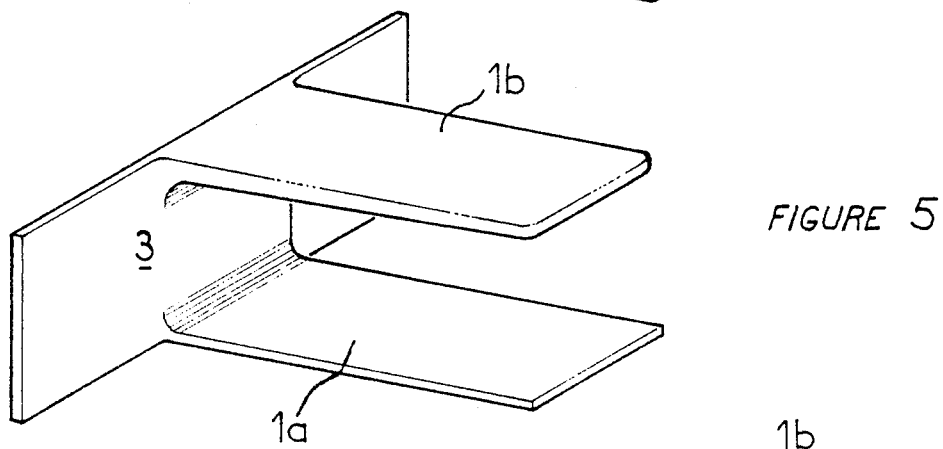
Figure 6:
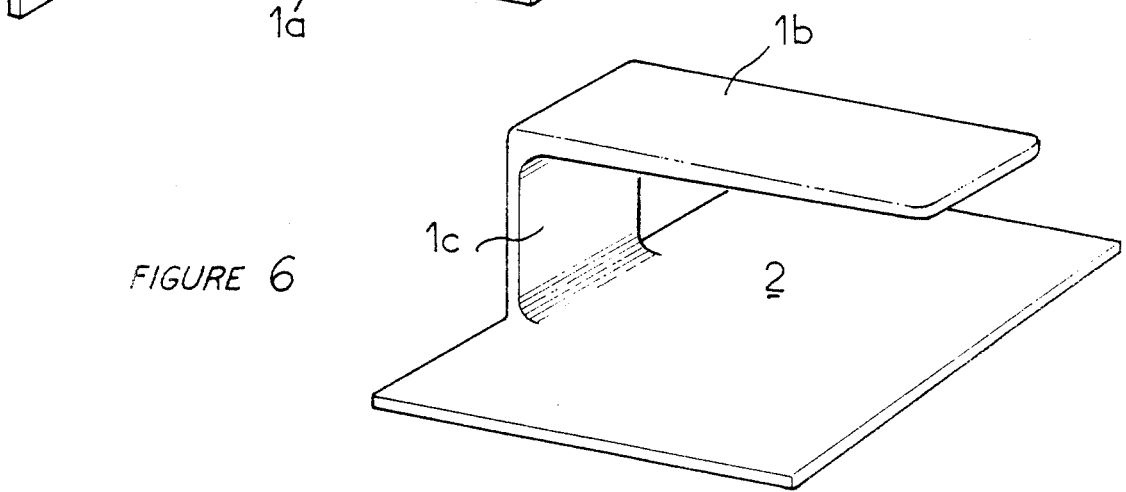

FIGS. 4, 5, and 6 show other embodiments in which the branches of the support are incorporated in the walls of the vehicle. Thus, in the support of FIG. 4, the lower branch is incorporated in the floor 2, and the central branch is incorporated in the side wall 3. In the support of FIG. 5, the lower branch 1a and the upper branch 1b are integral with the side wall 3; and in the embodiment shown in FIG. 6, the central branch 1c is integral with the floor 2. It will be seen, in these three figures, that the various branches are of unequal widths.

Figure 7:
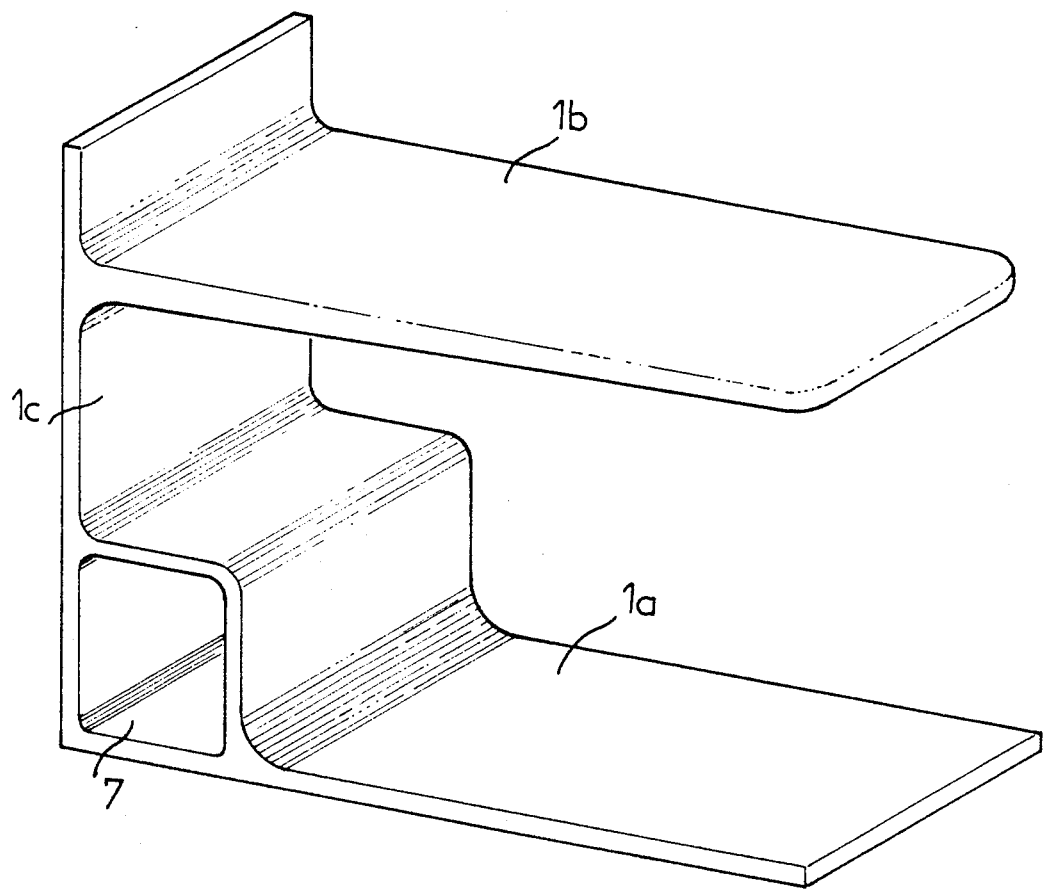
FIG. 7 shows another embodiment of the support which makes it possible to incorporate various supply lines.

In the embodiment illustrated in FIG. 7, a duct 7 is formed in the corner of the lower branch 1a and central branch 1c for the passage of the heating system and various pipelines.

The support according to the invention is thus of very simple design. It is easy to manufacture and easy to fit in public transport vehicles and, despite its overhanging structure, it does not subject the side walls of the vehicles, on which it has to be mounted, to excessively high stress and consequently avoids the need to use impractical reinforcements of unpleasant appearance.

I claim:

1. A seat support for a public transport vehicle, intended to be mounted overhung on a side wall of this vehicle, wherein the seat support comprises a framework and, as seen in section through a vertical plane perpendicular to the said wall, the framework of this support has a generally C-shaped cross section, including an upper branch to serve as a base for a seat,
a lower branch to rest on the floor of the vehicle and to be fixed to the latter, and
a vertical part joining the upper and lower branches together, and being designed to bear against the side wall of the vehicle and to be fixed to the latter;
each of the upper and lower branches having a generally flat planar shape, the upper and lower branches being parallel to each other;
the framework being adapted to be positioned adjacent the side wall of the vehicle, with the vertical part of the framework extending along said side wall, and with the upper and lower branches longitudinally extending away from the sidewalk of the vehicle and transversely extending in a direction parallel to said side wall; and
the upper branch having a first, generally uniform transversely extending width, the lower branch having a second, generally uniform transversely extending width, and said second width being at least as great as said first width.

2. A seat support according to claim 1, wherein the upper and lower branches have the same length.

3. A seat support according to claim 1, wherein the upper and lower branches have different lengths.

4. A seat support according to claim 1, wherein the width of the the lower branch and the vertical part are different than the width of the upper branch.

5. A seat support according to claim 1, wherein the lower branch is adapted to be recessed in the floor of the vehicle, and the vertical part is adapted to be incorporated into the side wall of the vehicle.

6. A seat support according to claim 1, wherein:

a lower portion of the vertical part and an inward portion of the lower branch form a lower corner of the seat support;
the seat support further includes a wall portion connected to and extending between the vertical part and the lower branch, over the lower corner of the seat support;
the lower portion of the vertical part, the inward portion of the lower branch and the wall portion form a duct transversely extending completely across the seat support over and along the lower corner thereof.

7. A seat support according to any one of claims 1, 2, 3 or 4, further comprising a support strut obliquely extending between the upper branch and a lower portion of the vertical part to help support the upper branch of the seat support, wherein a lower surface of the upper branch defines a recessed transverse groove, and the support strut is fitted into the groove and extends downward therefrom into contact with the lower portion of the vertical part.

8. A seat support according to claim 7, wherein:

the support strut has the shape of a curved triangle, including a base edge and a tip;
the base edge is held inside the groove; and
the tip is spaced from the base edge and points downward and away from said base edge.

9. A seat support for a transport vehicle having a floor and a side wall, the seat support comprising a frame including:

an upper branch to serve as a base for a seat;
a lower branch to rest on, and to be fixed to, the floor of the vehicle; and
a vertical part joining together the upper and lower branches, and to bear against and to connect the seat support to the side wall of the vehicle; and
a support strut obliquely extending between the upper branch and a lower portion of the vertical part to help support the upper branch of the seat support;
wherein a bottom surface of the upper branch defines a recessed transverse groove, and the support strut is fitted into the groove and extends downward therefrom into contact with the lower portion of the vertical part.

10. A seat support according to claim 9, wherein:

the support strut has the shape of a curved triangle, including a base edge and a tip;
the base edge is held inside the groove; and
the tip is spaced from the base edge and points downward and away from said base edge.

11. In a transport vehicle having a floor and a side wall, a seat support comprising a framework including:

an upper branch to serve as a base for a seat;

a lower branch resting on and fixed to the floor of the vehicle;

a vertical part joining together the upper and lower branches, and bearing against and connected to the side wall of the vehicle;

wherein each of the upper and lower branches has a generally flat, planar shape, and the upper and lower branches are parallel to each other and extend away from the side wall of the vehicle;

the upper branch has a first, generally uniform width in a direction parallel to the side wall of the vehicle;

the lower branch has a second, generally uniform width in a direction parallel to the side wall of the vehicle; and said second width being at least as large as said first width.

12. In the transport vehicle according to claim 11, wherein the lower branch of the vehicle is recessed in the floor of the vehicle.

13. In the transport vehicle according to claim 11, wherein the vertical part has a generally flat, planar shape and is incorporated into the side wall of the vehicle.

14. In the transport vehicle according to claim 11, wherein:

a lower portion of the vertical part and an inward portion of the lower branch form a lower corner of the seat support;

the seat support further includes a wall portion connected to and extending between the vertical part and the lower branch, over the lower corner of the seat support; and the lower portion of the vertical part, the inward portion of the lower branch and the wall portion form a duct transversely extending completely across the seat support, over and along the lower corner thereof.

* * * * *